US011132680B2

(12) United States Patent
Desai et al.

(10) Patent No.: US 11,132,680 B2
(45) Date of Patent: Sep. 28, 2021

(54) SYSTEM AND METHOD FOR PROVIDING MERCHANT IN CONTEXT CHECKOUT

(71) Applicant: PAYPAL, INC., San Jose, CA (US)

(72) Inventors: Darshan Desai, Fremont, CA (US); Kishore Jaladi, Campbell, CA (US)

(73) Assignee: PAYPAL, INC., San Jose, CA (US)

(*) Notice: Subject to any disclaimer, the term of this patent is extended or adjusted under 35 U.S.C. 154(b) by 748 days.

(21) Appl. No.: 15/851,576

(22) Filed: Dec. 21, 2017

(65) Prior Publication Data

US 2019/0197537 A1   Jun. 27, 2019

(51) Int. Cl.
| | |
|---|---|
| *G06Q 20/40* | (2012.01) |
| *G06Q 20/38* | (2012.01) |
| *G06Q 20/12* | (2012.01) |
| *G06Q 20/36* | (2012.01) |
| *G06Q 20/22* | (2012.01) |
| *G06Q 20/02* | (2012.01) |

(52) U.S. Cl.
CPC ......... *G06Q 20/401* (2013.01); *G06Q 20/027* (2013.01); *G06Q 20/12* (2013.01); *G06Q 20/227* (2013.01); *G06Q 20/3672* (2013.01); *G06Q 20/3674* (2013.01); *G06Q 20/385* (2013.01); *G06Q 20/3829* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 6,205,437 B1* | 3/2001 | Gifford | G06Q 10/087 705/39 |
| 2014/0075513 A1* | 3/2014 | Trammel | H04L 63/0876 726/4 |
| 2015/0365399 A1* | 12/2015 | Biswas | H04L 63/0815 726/8 |
| 2017/0289197 A1* | 10/2017 | Mandyam | H04L 63/06 |
| 2017/0330181 A1* | 11/2017 | Ortiz | G06Q 30/0226 |

* cited by examiner

*Primary Examiner* — John W Hayes
*Assistant Examiner* — Taylor S Rak
(74) *Attorney, Agent, or Firm* — Haynes and Boone, LLP

(57) ABSTRACT

Methods and systems for providing merchant in-context checkout are described. A user is authenticated based on credentials received from a first application running on a computing device. An authentication code is provided to the first application. A signed verifier and the authentication code is then received from a second application running on the computing device. The authentication code and the signed verifier received from the second application are then validated, and a device token is provided to the second application upon validation. The device token is exchangeable by the second application for an access token that is usable for making payment calls from the second application.

20 Claims, 6 Drawing Sheets

SYSTEM AND METHOD FOR PROVIDING MERCHANT IN CONTEXT CHECKOUT

TECHNICAL FIELD

The subject technology generally relates to online shopping checkout processes and more particularly, relates to a system and method that reduces the number of steps required for certain checkout process using a merchant's native application.

BACKGROUND

The use of personal electronic devices to make online purchase has become increasingly more common over the years. With the increasing popularity of online shopping, merchants are constantly striving to reduce friction of the checkout process for consumers in order to increase sales. One area of friction for consumers is the loss of context when using third-party payment services such as PayPal© during checkout. For example, when a user clicks on "Pay with PayPal" on a merchant native application, the user is required to switch to PayPal's website or application in order to provide credentials and complete payment review. After the review is complete, the user is returned to the merchant application to complete the transaction.

In this example, the required back and forth navigation between the merchant application and PayPal application produces a disjointed experience and may cause the consumer to be concerned about the payment process or even lose interest in the product the consumer is looking to purchase. Consequently, there is a need to provide an in-context checkout experience that allows the user to stay on the merchant application and not have to switch to a third-party payment application to complete a payment process. Furthermore, there is a preference for this in-context experience to be adapted to a merchant application without having to engage in server-side integrations.

SUMMARY

According to various aspects of the subject technology, a system for providing merchant in-context checkout is described. A user is authenticated based on credentials received from a first application running on a computing device. An authentication code is provided to the first application. A signed verifier and the authentication code is then received from a second application running on the computing device. The authentication code and the signed verifier received from the second application are then validated, and a device token is provided to the second application upon validation. The device token is exchangeable by the second application for an access token that is usable for making payment calls from the second application.

According to various aspects of the subject technology, a non-transitory machine-readable medium having stored thereon machine-readable instructions executable to perform merchant in-context checkout is described. A device token associated with a user of an application is determined to be stored on a secure element, and a signature for a verifier is requested from the secure element. A signed verifier and the access token are received from the secure element and sent to a server for validation. An access token is received from the server in response to the server validating the signed verifier and the access token. The access token is utilized to make payment calls to the server.

According to various aspects of the subject technology, a method for providing merchant in-context checkout is described. A username and password associated with a user are received from a first application. An access token is provided to the first application in response to verifying the received username and password for the user. The access token and a public key associated with the user are received from the first application. The public key and an authentication code are linked to an account corresponding to the user. An authentication code is provided to the first application. A signed verifier and the authentication code is then received from a second application running on the computing device. The authentication code and the signed verifier received from the second application are then validated, and a device token is provided to the second application upon validation. The device token is exchangeable by the second application for an access token that is usable for making payment calls from the second application.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
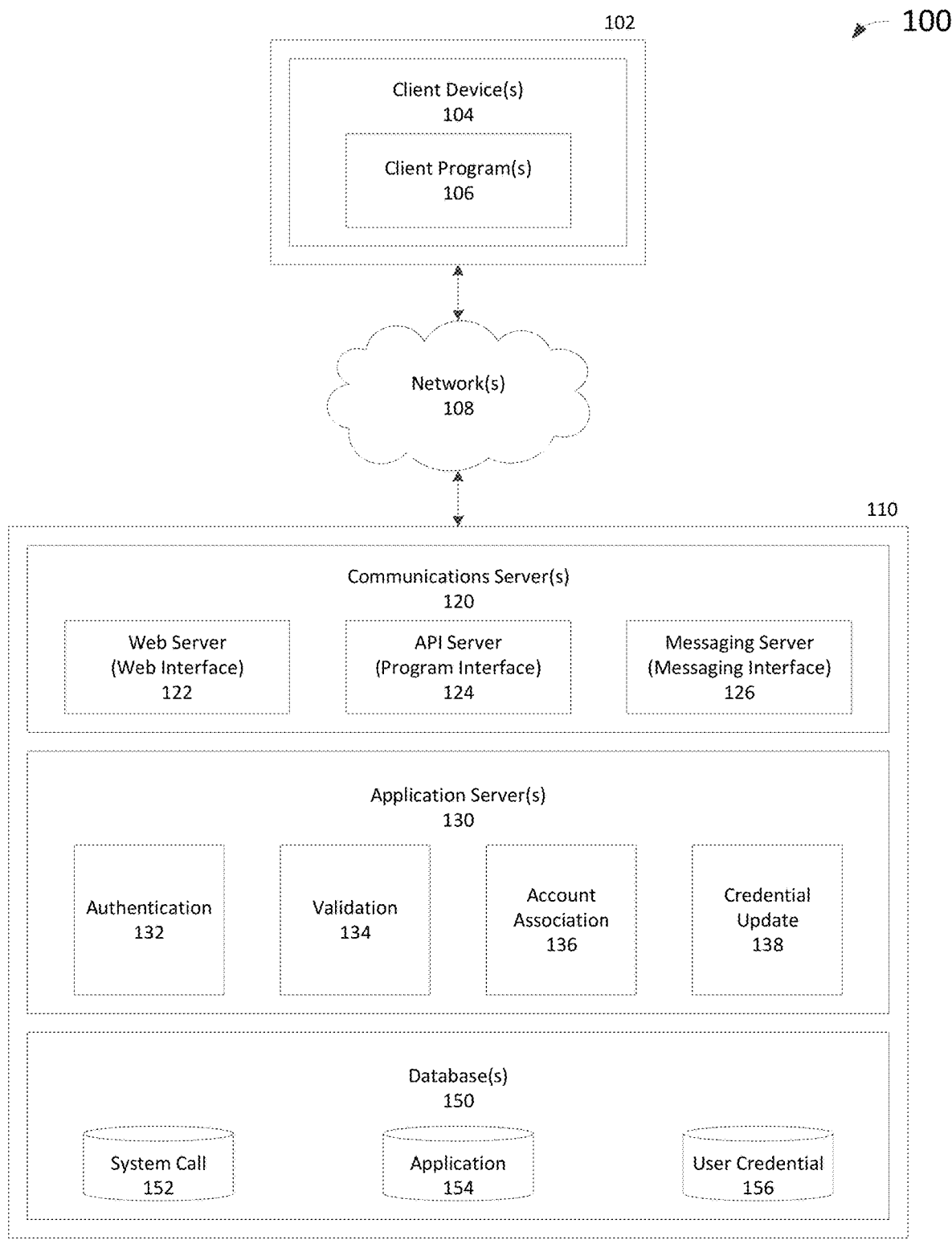
FIG. 1 is a block diagram of an exemplary computing system on which a merchant in-context checkout is implemented.

With more and more shopping being conducted online nowadays, merchants are continuously working to improve the shopping experience for consumers. One area of particular importance in the experience is the payment process. Many merchants provide the option to use third-party payment services such as PayPal© during checkout because such services enhance security by not requiring consumers to enter and transmit credit card and other payment information during the session. However, the use of a third-party payment service on a merchant application typically requires a redirect from the merchant application to the third-party payment service's website or application for the purpose of authenticating the user. Once the proper credentials are provided, the consumer is then sent back to the merchant's application to complete the transaction.

This back and forth navigation between the merchant application and the third-party payment service's website or application is disruptive to the shopping experience and thus may result in a loss of a sale. By providing an experience where the consumer is not caused to leave the merchant's application when using a third-party payment service, the merchant can recapture certain sales that may have otherwise been lost as a result of the disjointed experience.

The description that follows includes exemplary systems, methods, techniques, instruction sequences and computer program products that embody techniques of the present inventive subject matter. However, it is understood that the described embodiments may be practiced without these specific details. The discussion below relates to insights and analytics, which can power decisions but are underutilized. Decisions based on traditional data analysis can require, for proper utilization, months or even years-worth of data. However, using a combination of methods discussed herein, it is possible to generate quick internal insights and analytics, and develop an external product utilizing the same data.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

FIG. 1 illustrates an exemplary embodiment of a computing system adapted for implementing one or more embodiments disclosed herein to provide a merchant in-context checkout process. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a merchant native application, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and network-based system 110 may take place, as will be readily appreciated. In particular, wireless communications of any suitable form (e.g., Bluetooth, near-field communication, etc.) may take place between client device 104 and network-based system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include an authentication engine 132, a validation engine 134, account association engine 136, and/or credential update engine 138. These servers and/or components, which may be in addition to other servers, may be structured and arranged to identify those webpages that malicious content.

Application servers 130, in turn, may be coupled to and capable of accessing one or more databases 150 including system call database 152, application database 154, and/or authentication credential 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
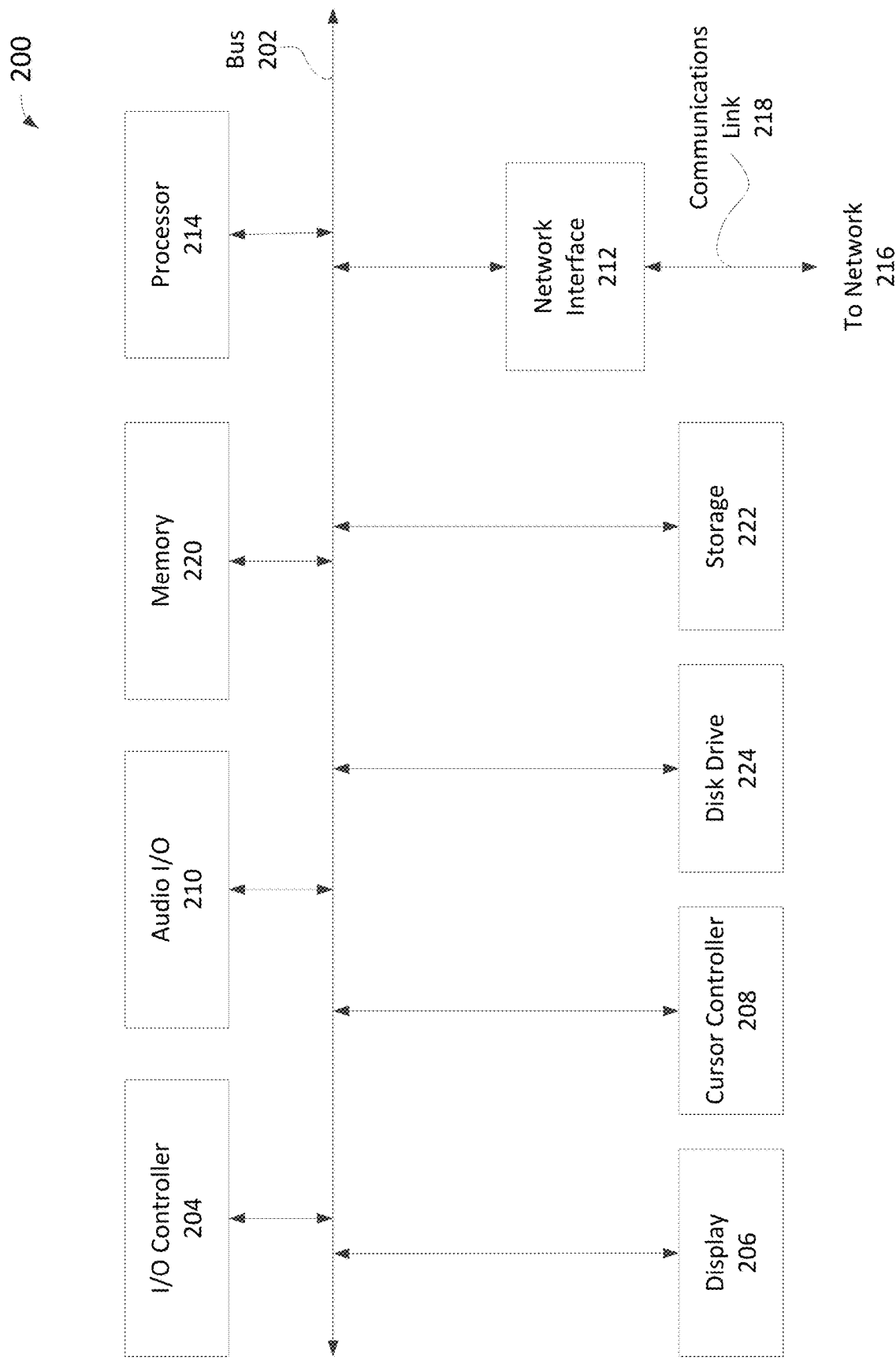
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor controller 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
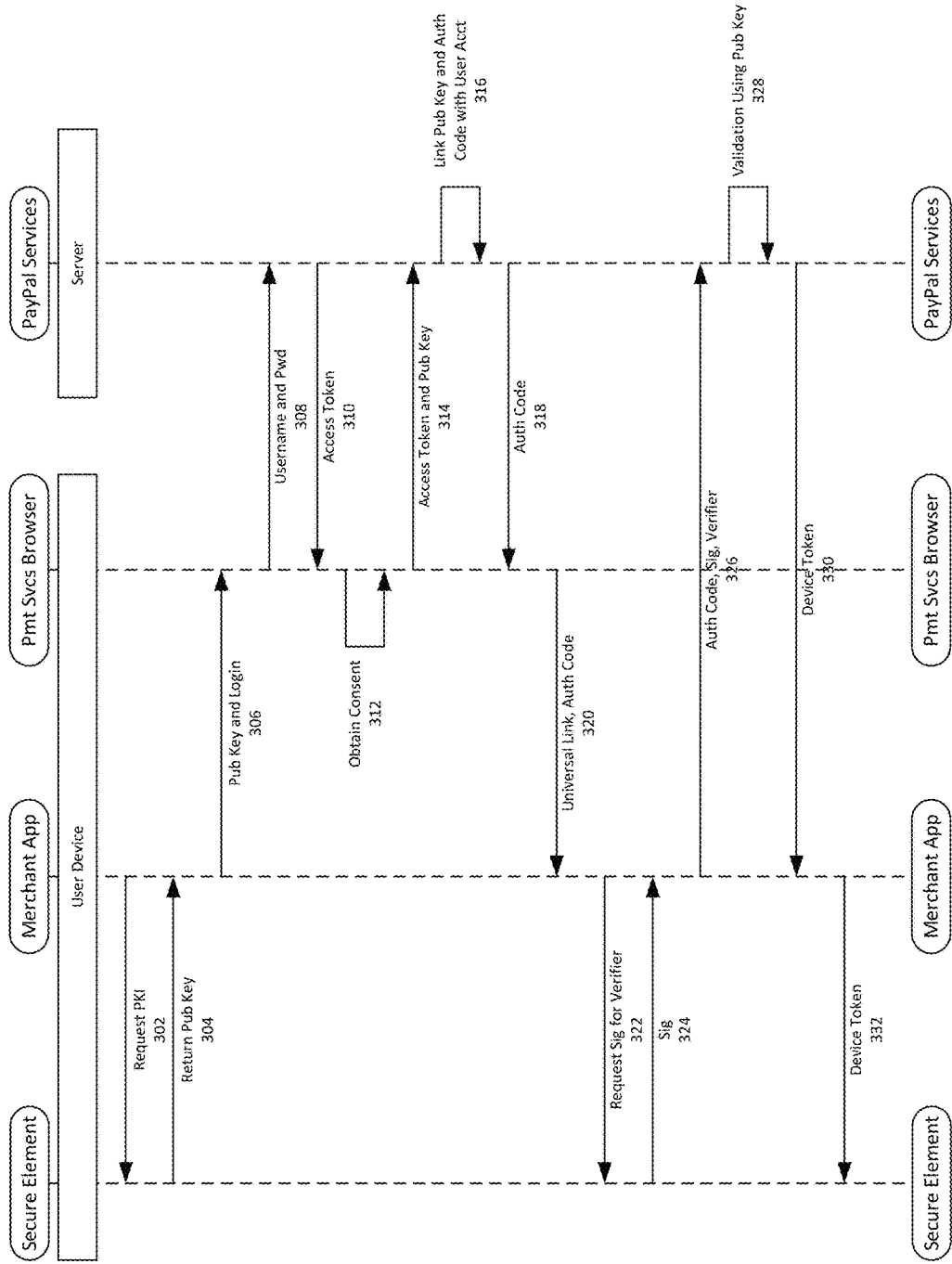
FIG. 3 provides a flow diagram depicting the implementation of the merchant in-context checkout on a merchant application.

FIG. 3 provides a flow diagram depicting an example manner in which the merchant in-context checkout is implemented. While the example below is provided in the context of PayPal Payments Standard, it can be appreciated that the same process can be performed across a variety of third-party payment services. Additionally, the flow diagram depicted in FIG. 3 is directed to a first-time log in by a user. Thus, this process requires a one-time redirect to a browser or third-party payment service application for authentication. Once authenticated, in-context checkout may be set up for subsequent visits to the merchant application.

To implement merchant in-context checkout, the third-party payment service may provide a Software Development Kit (SDK) that is to be placed in a merchant application. The SDK enables the merchant application to communicate with a server of the third-party payment service (e.g., PayPal Services) in order to enable in-context native checkout experience to consumers. The resulting merchant in-context checkout experience allows a user to complete a purchase on the merchant application without being redirected to a browser or application different from the merchant application on which the shopping is being conducted, as will be described in detail below. Furthermore, the SDK is able to enable these services with no additional integration with the merchant's server.

The checkout process begins when a user initiates payment by a third-party payment service by clicking on a corresponding checkout button within a merchant application. Once checkout is initiated, a request is sent by the SDK to the secure element for the generation of a public and private key pair in step 302. The secure element retains the generated private key while returning the public key to the SDK in step 304. In some embodiments, the secure element may include storage and/or an execution environment. The public key is then passed from the SDK to a browser along with a request for initiating a login session for the third-party payment service account in step 306. As indicated above, this process is associated with a first-time log in by the user. Accordingly, a one-time authentication by the third-party payment service is required.

When the login session is prompted, the user's device switches context from the merchant application to the browser. The browser prompts the user for login credentials, e.g., a username or email and an associated password for the account. Once provided by the user, the username and corresponding password is then passed to the third-party payment service server in step 308 for verification. Upon confirming that the username and password pair is correct, the third-party payment service server returns an access token to the browser in step 310.

When the access token is received, the browser prompts the user for consent in step 312. The consent allows the SDK to receive and store certain information to enable in-context checkout using the third-party payment service during future visits to the merchant application. The in-context checkout, if consented to, allows the user to checkout without having to navigate to the browser and then back to the merchant application, thereby providing a less disjointed shopping experience. Once the user consents via the browser, the access token and public key is passed from the browser to the third-party payment service server in step 314. PayPal services then links the public key and an authentication code with the user's account in step 316, and passes back the authentication code to the browser in step 318. At step 320, a universal link triggers a switch from the browser to the merchant application (i.e., the originating merchant application), and concurrently passes the authentication code from the browser to the SDK.

Once received, the SDK works to exchange the authentication code for a device token. Accordingly, in step 322, the SDK submits a requests for the secure element to generate a signature for a verifier (i.e., a nonce and a timestamp). The signature is returned from the secure element to the SDK in step 324. In step 326, the SDK sends the authentication code, the signature and the verifier to the third-party payment service server for validation. The third-party payment service server performs the validation in step 328 using the public key that was passed to the server during the consent step. Furthermore, the third-party payment service server associates a device token with the public key and the user account.

Upon successful validation, the associated device token is then passed back to the SDK in step 330. The device token is then stored in the secure element in step 332. The device token, as the name suggests, is device specific and can be used in a recurring manner each time the user chooses the third-party payment service for checkout within a merchant application. Thus, once the device token is passed back to and stored on the SDK, the merchant application is set up to perform the in-context checkout. With in-context checkout now set up, future checkouts on the merchant application using the third-party payment service will be performed using the device token, where the SDK communicates directly with the third-party payment service server without having to redirect the user to the third-party payment service website or application for authentication.

In some embodiments, a signature from the secure element may be used in place of a public key and vice versa. For example, in response to receiving the public key in step 304, the SDK may request that the secure element generate a signature for a verifier (i.e., a nonce and a timestamp). The signature is returned from the secure element to the SDK where the signature is stored. Then in step 306, instead of passing the public key to a browser along with a request for initiating a login session for the third-party payment service, the SDK passes the signature with the request. Likewise, the signature is passed with the access token from the browser to the third-party payment service server in step 314.

Since the signature and not the public key is passed to the server, the signature is then linked with the user account for the authentication code in step 316. In step 326, rather than sending the signature along with the authentication code and the verifier, the SDK sends public key to the third-party payment service server for validation. The third-party payment service server then performs the validation in step 328 using the signature that was passed to the server during the consent step.

Figure 4:
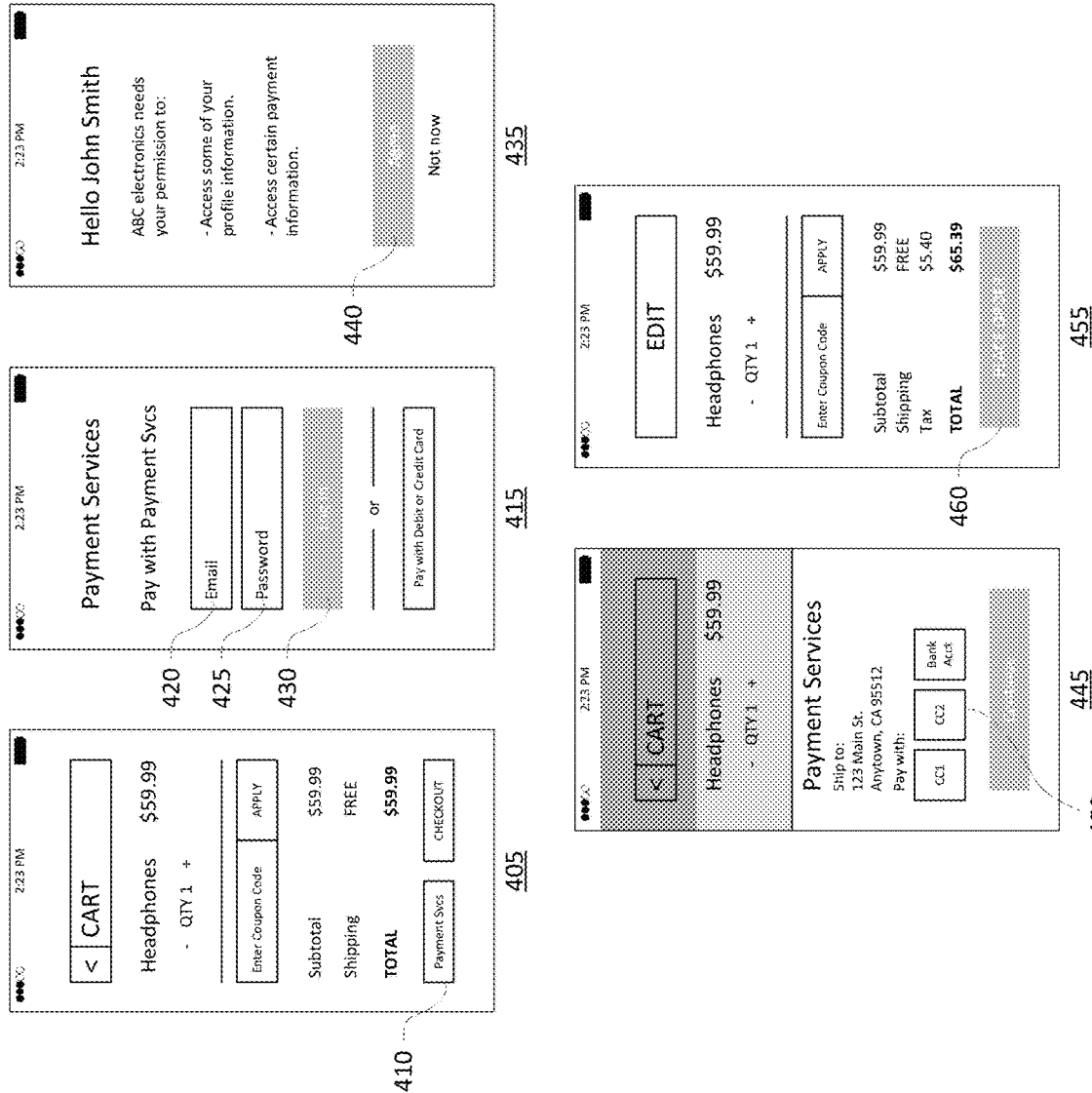
FIG. 4 provides example illustrations of the user interface during the implementation of the in-context checkout on a computing device.

FIG. 4 provides example illustrations of the user interface during the implementation of the in-context checkout on a computing device. As indicated above, the checkout process begins at merchant checkout user interface (UI) 405 when a user initiates payment by a third-party payment service on by clicking on a corresponding checkout button 410 for a third-party payment service. Once checkout is initiated, a request for initiating a login session for the third-party payment service is made. In response to the request, the session is redirected to a third-party payment service login UI 415, where the user is prompted to enter an email and password in corresponding email entry box 420 and password entry box 425. As shown in FIG. 4, the third-party payment service login UI 415 is completely different from that of the merchant checkout UI.

Once the user has entered his credentials and presses the login button 430, a third-party consent UI 435 is presented to the user by the third-party payment service. Upon consenting to the agreement by pressing the agree button 440 presented in the third-party consent UI 435, in-context checkout using the third-party payment service is enabled for future visits to the merchant.

The user consent further causes a redirect back to a second merchant checkout UI 445, where the merchant checkout page is shown in the background, and the third-party payment service information is overlaid in the foreground. The third-party payment service information overlaid in the foreground provides the user with payment options 450 from which to choose. Once the payment options is selected and confirmed, a third merchant checkout UI 455 is fully displayed with no overlays from the third-party payment service. The user can then complete the purchase by clicking the place order button 460 on the third merchant checkout UI 455.

Figure 5:
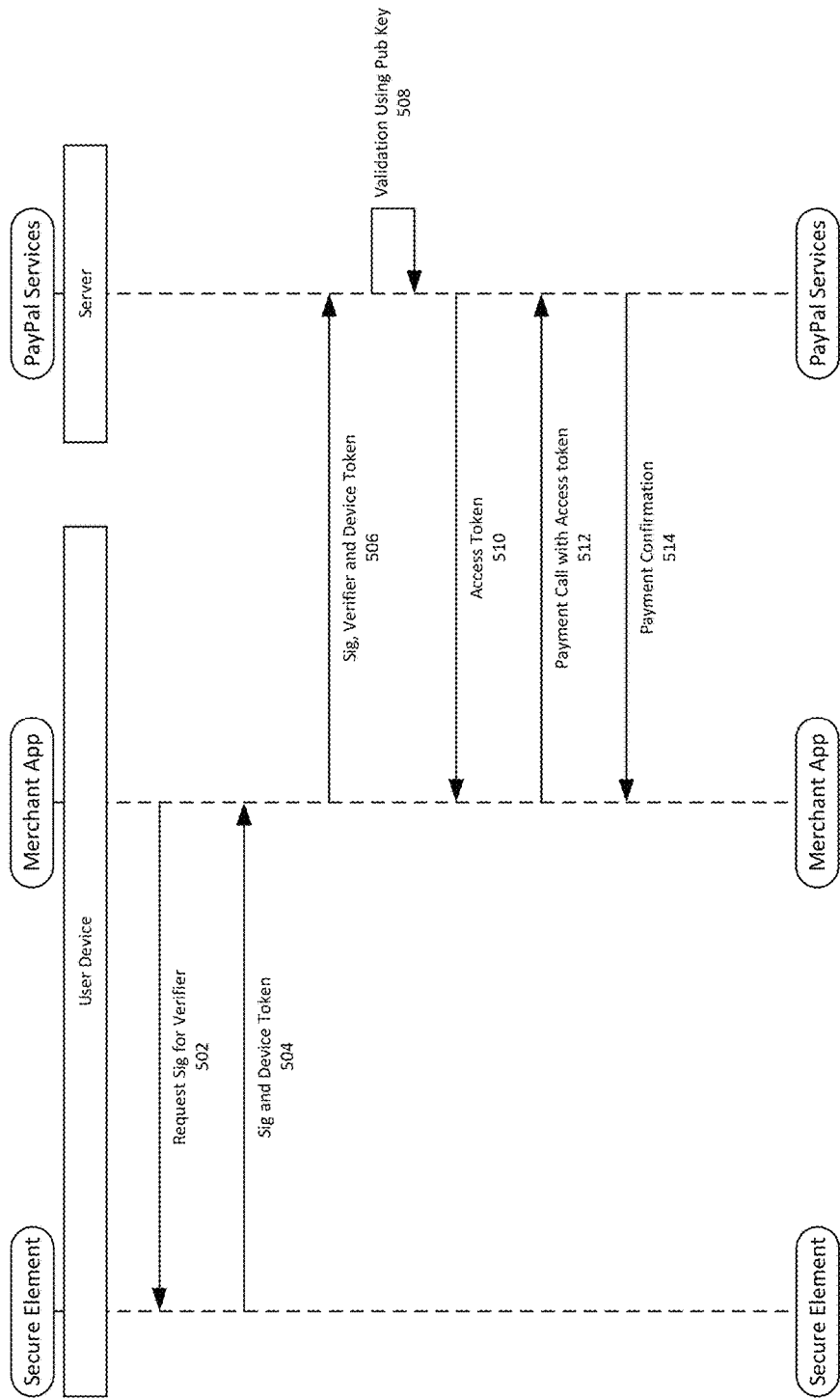
FIG. 5 provides a flow diagram depicting a merchant in-context checkout transaction being processed.

FIG. 5 provides a flow diagram depicting an example manner in which the merchant in-context checkout is executed once set up. The in-context checkout begins when the user initiates payment by the third-party payment service by clicking on the corresponding checkout button within the merchant application. This time, however, when checkout is initiated, the SDK determines that a device token associated with the merchant application has been previously stored on the secure element. Accordingly, rather than sending a request for the secure element to generate a public and private key pair as typical in a traditional checkout, the SDK simply requests that the secure element generate a signature for a verifier (i.e., a nonce and a timestamp) in step 502. The secure element then returns the signature along with the device token to the SDK in step 504. The device token is sent to the SDK when the third-party payment service has already been authorized and the user authenticated in a previous transaction.

Next, the SDK makes a call to the third-party payment service server for validation by sending the signature, verifier and device token in step 506. The third-party payment service server validates the signature, verifier and device token using the public key in step 508. Upon successful validation, an access token is returned to the SDK in step 510. The access token is then used by the SDK to make a payment call to the third-party payment service in step 512. The third-party payment service server confirms the payment to be made and returns the confirmation to the SDK in step 514. If, however, the access token is not available, or the third-party payment service server is unable to validate the signature, verifier and device token, the SDK would then require the use to sign in via conventional manners, i.e., by using the browser or application of the third-party payment service to log in.

By using the merchant in-context checkout describe in FIG. 5, the user is able to complete a purchase using the third-party payment service without having to be redirected to the third-party payment service application or website for entry of credentials. In other words, the user may stay on the merchant application and not lose context in the shopping experience. This in-context checkout provides a seamless experience, and thus may result in fewer abandoned shopping carts or aborted shopping sessions.

In some embodiments, when the user initiates payment by clicking the checkout button, the merchant application generates an express checkout token and prepares a checkout uniform resource location (URL) containing the express checkout token. The merchant application then passes that URL to the SDK along with a merchant client ID, a merchant app universal link-redirect uniform resource identifier (uri), and the express checkout token.

In some embodiments, the public and private key pair is generated by a keychain application programming interface that is called by the SDK. The SDK may also check the keychain to determine whether a flag indicating that the user has already consented and enrolled in the merchant in-context checkout exists. If so, the checkout proceeds as described by the flow depicted in FIG. 5. Otherwise, a traditional checkout as depicted in FIG. 3 is used.

Figure 6:
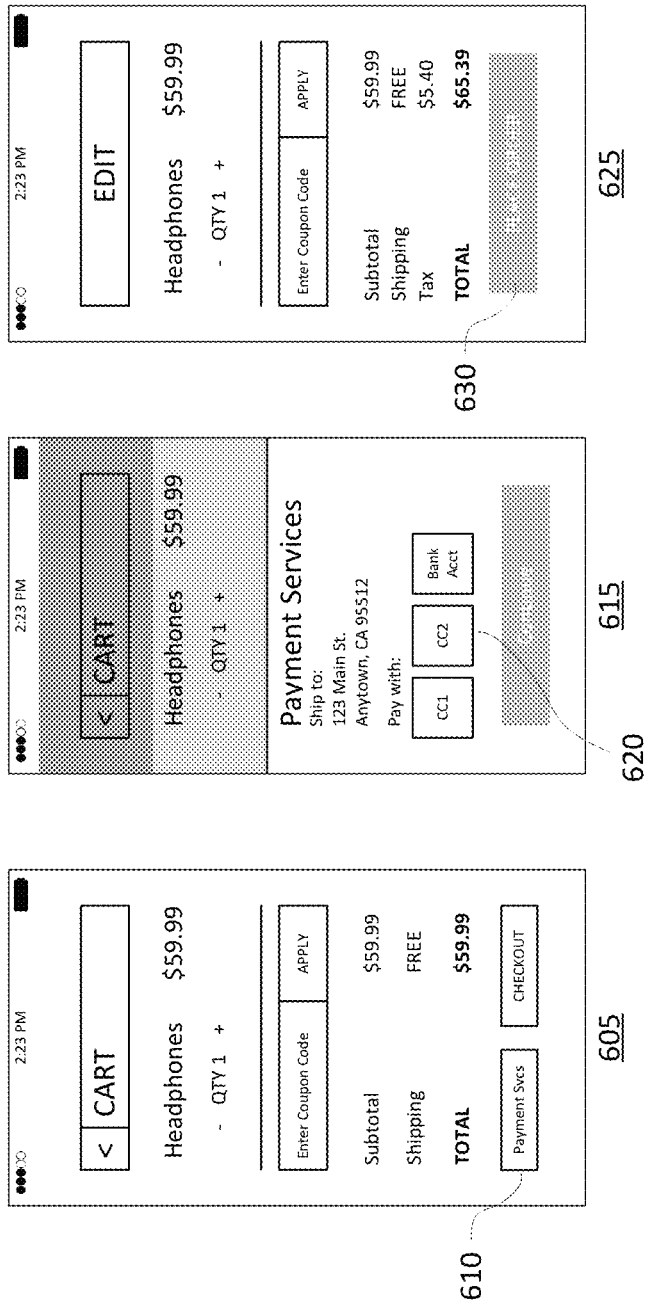
FIG. 6 provides example illustrations of the user interface during an in-context checkout session on the computing device.

FIG. 6 provides example illustrations of the user interface during an in-context checkout session on the computing device. In this example, the in-context checkout has already been consented to and implemented in a previous session. In other words, the user will now be able to checkout without having to be redirected to a third-party payment service interface to provide credentials. The checkout process begins at merchant checkout user interface (UI) 605 when a user initiates payment by a third-party payment service on by clicking on a corresponding checkout button 610 for a third-party payment service. Once checkout is initiated, a determination is made that in-context checkout has been consented to and implemented (i.e., a device token associated with the merchant application has been stored on the secure element).

In response to this determination, the user is directed to a second merchant checkout UI 445, where the merchant checkout page is shown in the background, and the third-party payment service information is overlaid in the foreground. The third-party payment service information overlaid in the foreground provides the user with payment options 620 from which to choose. Once the payment options is selected and confirmed, a third merchant checkout UI 625 is fully displayed with no overlays from the third-party payment service. The user can then complete the purchase by clicking the place order button 630. This example demonstrates the maintenance of context during the checkout process. Whereas the example UIs in FIG. 4 show that the user is redirected to the third-party payment service page, the in-context checkout experience depicted in FIG. 6 clearly shows that the user is kept within the merchant application environment for the entirety of the checkout, thereby providing the same context in each step. The ability to maintain such consistent context often proves vital to keeping consumers from abandoning shopping carts or quitting a shopping session altogether.

While the above examples illustrates the preferred use of in-context checkout in a merchant application environment, the same in-context checkout may be implemented for peer-to-peer (P2P) money transfers as well. Specifically, P2P money transfers that are conducted via third-party applications, e.g., on direct messaging platforms, may utilize the same measures to maintain context when transferring funds. For example, if a user is to send funds via a messaging service, the initial experience may require that the user log in on the third-party payment service application or website. Once that has been accomplished, the user may be provided an option to consent to having certain information stored on the computing device (e.g., storing a device token on the secure enclave of a mobile device). With the user's consent, subsequent attempts to send money to a contact via the messaging service will bypass the login step since the device token may be exchanged for a access token via direct contact between the SDK And the third-party payment service server.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
a non-transitory memory; and
one or more hardware processors coupled to the non-transitory memory, the non-transitory memory storing computer readable instructions, that when executed cause the one or more hardware processors to perform operations comprising:
receiving credentials from a first application on a computing device in communication with the system, wherein the credentials comprise a username and a password;
authenticating a user associated with the computing device based on the credentials, wherein the authenticating comprises:
verifying the received username and password,
providing a first access token to the first application,
receiving the first access token and a public key associated with the user from the first application, and
linking the public key and an authentication code to an account corresponding to the user;
providing the authentication code to the first application;
receiving a signed verifier and the authentication code from a second application on the computing device;
validating the authentication code and the signed verifier received from the second application; and
providing a device token associated with the computing device to the second application based on the validating, wherein the device token comprises data exchangeable by the second application for making payment calls from the second application.

2. The system of claim 1, wherein the authentication code and the signed verifier are validated using the public key received from the first application.

3. The system of claim 2, wherein the public key is received from a secure element of the computing device based on a request by the second application.

4. The system of claim 3, wherein the device token is provided to the second application for storage by the second application in the secure element.

5. The system of claim 4, wherein the operations further comprise:
receiving from the second application a second signed verifier and the device token stored by the secure element;
validating the second signed verifier and the device token received from the second application; and
providing a second access token to the second application, wherein the second access token comprises data for making the payment calls from the second application.

6. The system of claim 5, wherein the operations further comprise:
receiving from the second application a payment call with the second access token;
verifying the second access token; and
providing a payment confirmation in response to the payment call.

7. The system of claim 1, wherein the first application is associated with a first organization and the second application is associated with a second organization different from the first organization.

8. The system of claim 7, wherein the first organization is a third-party payment service and the second organization is a merchant.

9. The system of claim 8, wherein the first application is a browser and the second application is a native application of the merchant.

10. A method comprising:
receiving, by a network-based system, a username and a password associated with a user from a first application;
verifying, by the network-based system, the received username and password;
providing, by the network-based system, a first access token to the first application in response to verifying the received username and password for the user;
receiving, by the network-based system, the first access token and a public key associated with the user from the first application;
linking, by the network-based system, the public key and an authentication code to an account corresponding to the user;
providing, by the network-based system, the authentication code to the first application;
receiving, by the network-based system, a signed verifier and the authentication code from a second application on the computing device;
validating, by the network-based system, the authentication code and the signed verifier received from the second application using the public key; and
providing, by the network-based system, a device token associated with the computing device to the second application based on the validating, wherein the device token comprises data exchangeable by the second application for making payment calls from the second application.

11. The method of claim 10, further comprising:
receiving, by the network-based system, from the second application a second signed verifier and the device token stored by a secure element of the computing device;
validating, by the network-based system, the second signed verifier and the device token received from the second application;
providing, by the network-based system, a second access token to the second application;
receiving, by the network-based system, from the second application a payment call with the second access token;
verifying, by the network-based system, the second access token; and
providing, by the network-based system, a payment confirmation in response to the payment call.

12. The method of claim 10, wherein the first application is associated with a first organization and the second application is associated with a second organization different from the first organization, and wherein the first organization is a third-party payment service and the second organization is a merchant.

13. A non-transitory machine-readable medium having stored thereon machine-readable instructions executable by at least one processor to cause performance of operations comprising:
receiving credentials from a first application on a computing device in communication with the at least one processor, wherein the credentials comprise a username and a password;
authenticating a user associated with the computing device based on the credentials, wherein the authenticating comprises:
verifying the received username and password, providing a first access token to the first application,
receiving the first access token and a public key associated with the user from the first application, and linking the public key and an authentication code to an account corresponding to the user,
providing the authentication code to the first application;
receiving a signed verifier and the authentication code from a second application on the computing device;
validating the authentication code and the signed verifier received from the second application; and
providing a device token associated with the computing device to the second application based on the validating, wherein the device token comprises data exchangeable by the second application for making payment calls from the second application.

14. The non-transitory machine-readable medium of claim 13, wherein the authentication code and the signed verifier are validated using the public key received from the first application.

15. The non-transitory machine-readable medium of claim 14, wherein the public key is received from a secure element of the computing device based on a request by the second application.

16. The non-transitory machine-readable medium of claim 15, wherein the device token is provided to the second application for storage by the second application in the secure element.

17. The non-transitory machine-readable medium of claim 16, wherein the operations further comprise:
receiving from the second application a second signed verifier and the device token stored by the secure element;
validating the second signed verifier and the device token received from the second application; and
providing a second access token to the second application, wherein the second access token comprises data for making the payment calls from the second application.

18. The non-transitory machine-readable medium of claim 17, wherein the operations further comprise:
receiving from the second application a payment call with the second access token;
verifying the second access token; and
providing a payment confirmation in response to the payment call.

19. The non-transitory machine-readable medium of claim 13, wherein the first application is associated with a first organization and the second application is associated with a second organization different from the first organization.

20. The non-transitory machine-readable medium of claim 19, wherein the first organization is a third-party payment service and the second organization is a merchant.

* * * * *